(12) United States Patent  (10) Patent No.: US 8,391,590 B2
Yalla et al.  (45) Date of Patent: Mar. 5, 2013

(54) SYSTEM AND METHOD FOR THREE-DIMENSIONAL BIOMETRIC DATA FEATURE DETECTION AND RECOGNITION

(75) Inventors: Veeraganesh Yalla, Richardson, TX (US); Colby Boles, Seattle, WA (US); Raymond Charles Daley, Richardson, TX (US); Robert Kyle Fleming, Dallas, TX (US)

(73) Assignee: FlashScan3D, LLC, San Antonio, TX (US)

( * ) Notice: Subject to any disclaimer, the term of this patent is extended or adjusted under 35 U.S.C. 154(b) by 395 days.

(21) Appl. No.: 12/717,347

(22) Filed: Mar. 4, 2010

(65) Prior Publication Data

US 2011/0216948 A1   Sep. 8, 2011

(51) Int. Cl.
*G06K 9/00* (2006.01)

(52) U.S. Cl. ........ 382/154; 382/118; 382/115; 382/132; 382/116; 382/119; 382/120; 382/124; 382/125; 382/126; 340/5.53; 340/5.83

(58) Field of Classification Search ............ 382/154, 382/118, 115, 116, 132, 119, 120, 124, 125, 382/126; 340/5.53, 5.83
See application file for complete search history.

(56) References Cited

U.S. PATENT DOCUMENTS

| 5,155,775 | A  | 10/1992 | Brown |
| 6,611,343 | B1 | 8/2003  | Frankowski |
| 7,212,330 | B2 | 5/2007  | Seo et al. |
| 7,292,711 | B2 | 11/2007 | Kiraly et al. |
| 7,599,531 | B2 | 10/2009 | Hauke et al. |
| 2005/0249388 | A1 | 11/2005 | Linares |
| 2006/0045316 | A1 | 3/2006 | Hauke et al. |
| 2006/0098089 | A1 | 5/2006 | Sofer |
| 2006/0120576 | A1* | 6/2006 | Chen .................. 382/124 |
| 2007/0229850 | A1* | 10/2007 | Herber ............... 356/604 |
| 2007/0273957 | A1 | 11/2007 | Zalevsky et al. |
| 2007/0299338 | A1 | 12/2007 | Stevick et al. |
| 2008/0253620 | A1 | 10/2008 | Hashimoto |
| 2009/0103777 | A1 | 4/2009 | Hassebrook et al. |

(Continued)

FOREIGN PATENT DOCUMENTS

EP   1612717 B1   3/2005
JP   2004192633 A   11/2003

(Continued)

OTHER PUBLICATIONS

Becker, Combining Rule-based and Machine Learning Approaches for Shape Recognition: Applied Imagery Pattern Recognition Workshop, 2007. 36th IEEE; Oct. 10-12, 2007; pp. 65-70.

(Continued)

*Primary Examiner* — Mike Rahmjoo
(74) *Attorney, Agent, or Firm* — Garlick & Markison; Jessica W. Smith

(57) ABSTRACT

The system includes a 3D feature detection module and 3D recognition module 202. The 3D feature detection module processes 3D surface map of a biometric object, wherein the 3D surface map includes a plurality of 3D coordinates. The 3D feature detection module determines whether one or more types of 3D features are present in the 3D surface map and generates 3D feature data including 3D coordinates and feature type for the detected features. The 3D recognition module compares the 3D feature data with biometric data sets for identified persons. The 3D recognition module determines a match between the 3D feature data and one of the biometric data sets when a confidence value exceeds a threshold.

2 Claims, 14 Drawing Sheets

U.S. PATENT DOCUMENTS

2009/0208070 A1  8/2009  Fourre et al.
2009/0310830 A1  12/2009  Bolle et al.

FOREIGN PATENT DOCUMENTS

| JP | 2007179267 A | 12/2005 |
| JP | 2007310429 A | 11/2007 |
| WO | 2007/050776 A2 | 5/2007 |

OTHER PUBLICATIONS

International Search Report, Application No. PCT/09/43056; Apr. 1, 2010; pp. 1-3.

* cited by examiner

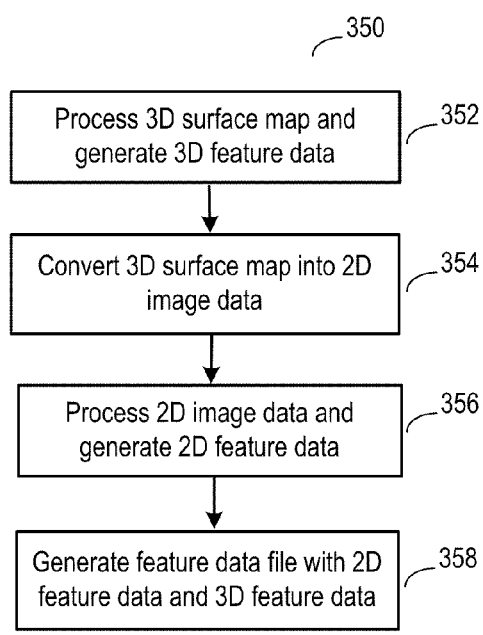
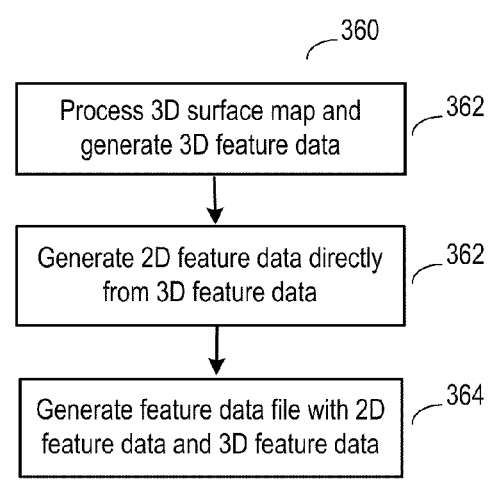
FIG. 9a
FIG. 9b

SYSTEM AND METHOD FOR THREE-DIMENSIONAL BIOMETRIC DATA FEATURE DETECTION AND RECOGNITION

CROSS-REFERENCE TO RELATED PATENTS

Not applicable.

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not applicable.

BACKGROUND OF THE INVENTION

1. Technical Field of the Invention

This invention relates to three-dimensional (3D) biometric data processing and in particular to systems and methods for processing 3D biometric data for feature detection, classification and recognition.

2. Description of Related Art

Biometrics is the science of measuring and analyzing biological data. In law enforcement and security fields, biometrics is used to measure and analyze human features, such as fingerprints, facial patterns, palm prints, retinas, etc. Currently, binary or two-dimensional fingerprint images are the most relied upon biometric measurement for verifying a person's identity and for linking persons to a criminal history and for background checks. Criminal justice agencies rely on binary fingerprint images for positive identification to latent prints collected as evidence at crime scenes and in processing persons through the criminal justice system.

The National Institute of Science and Technology (NIST) and the American National Standards Institute (ANSI) supports the ANSI/NIST-ITL 1-2000 Data Format for the Interchange of Fingerprint, Facial, & Scar Mark & Tattoo (SMT) Information. This standard defines the content, format, and units of measurement for the exchange of biometric image information, such as fingerprint, palm print, facial/mug shot, and scar, mark, & tattoo (SMT) image information that may be used in the identification process of a subject. The information consists of a variety of mandatory and optional items, including scanning parameters, related descriptive and record data, digitized fingerprint information, and compressed or uncompressed images. This information is intended for interchange among criminal justice administrations or organizations that rely on automated fingerprint and palm print identification systems or use facial/mug shot or SMT data for identification purposes. Other organizations have different standards as well for the content, format or units of measurement for biometric information. The fingerprint and palmprint images meeting specified NIST and ANSI standards allow for matching of print images in large databases of existing fingerprint and palm-print based records. For example, the FBI maintains an Interstate Identification Index System for fingerprints and palm prints. Currently, the biometric image information required by NIST and ANSI standards for fingerprints and palm prints includes only binary biometric images or two-dimensional coordinates of fingerprint features.

In addition, the most common methods of finger print and palm print acquisition collect two-dimensional biometric images. One method is a rolled ink print technique wherein a trained technician manipulates a person's finger or hand on paper to capture an ink print that meets industry standards. Another method is electronic scanning of a finger or palm as it contacts a surface to generate a two-dimensional (2D) binary image.

Systems are currently being developed for non-contact means of acquiring fingerprints using 3D imaging techniques. Recent advancements in the fields of computing hardware and software have made capturing 3D biometric data a more practical solution. For example, one method of capturing 3D biometric image data is described in PCT Application No. WO2007/050776, entitled System and Method for 3D Imaging using Structured Light Illumination, which is incorporated by reference herein.

For backward compatibility with the existing fingerprint databases, acquired 3D biometric image data is converted into a gray scale 2D image. In addition, the 2D gray scale image may be further converted into a 2D binary image. For example, an $l(x,y)$ value is generated to represent the gray-level of a point of the fingerprint in two dimensions. A binarization of the gray scale image is then performed by assigning gray levels close to 0 to surface valleys and dark pixels with high values of gray to ridges. The ridges and valleys of the 2D binary image are then processed to detect features of the fingerprint. The detected features of the fingerprint are described with a location having two-dimensional coordinates. The detected features then are used to perform validation, classification and recognition tasks.

BRIEF DESCRIPTION OF THE SEVERAL VIEWS OF THE DRAWINGS

FIGS. 9a and 9b illustrate embodiments of a method of operation of the 3D feature detection module;

DETAILED DESCRIPTION OF THE INVENTION

When acquired 3D biometric image data is converted into a gray scale 2D image for compatibility with NIST and ANSI standards, potentially useful data is lost. Therefore, a need exists to provide a method and a system for detection, validation, classification and recognition of biometric features using 3D biometric data.

Figure 1:
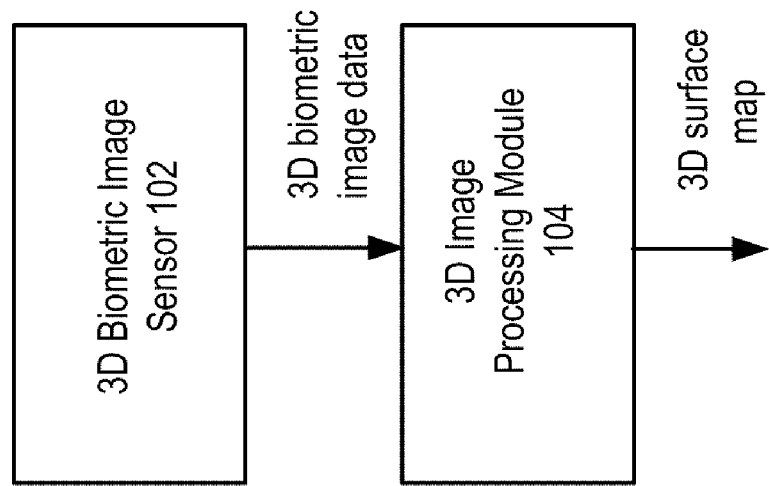
FIG. 1 illustrates a schematic block diagram of an embodiment of a 3D image sensor and processing module.

FIG. 1 illustrates a schematic block diagram of an embodiment of a system for 3D biometric data detection and recognition. A 3D biometric image sensor 102 captures one or more images of a fingerprint, palm print or other biometric object and generates 3D biometric image data.

Figure 2:
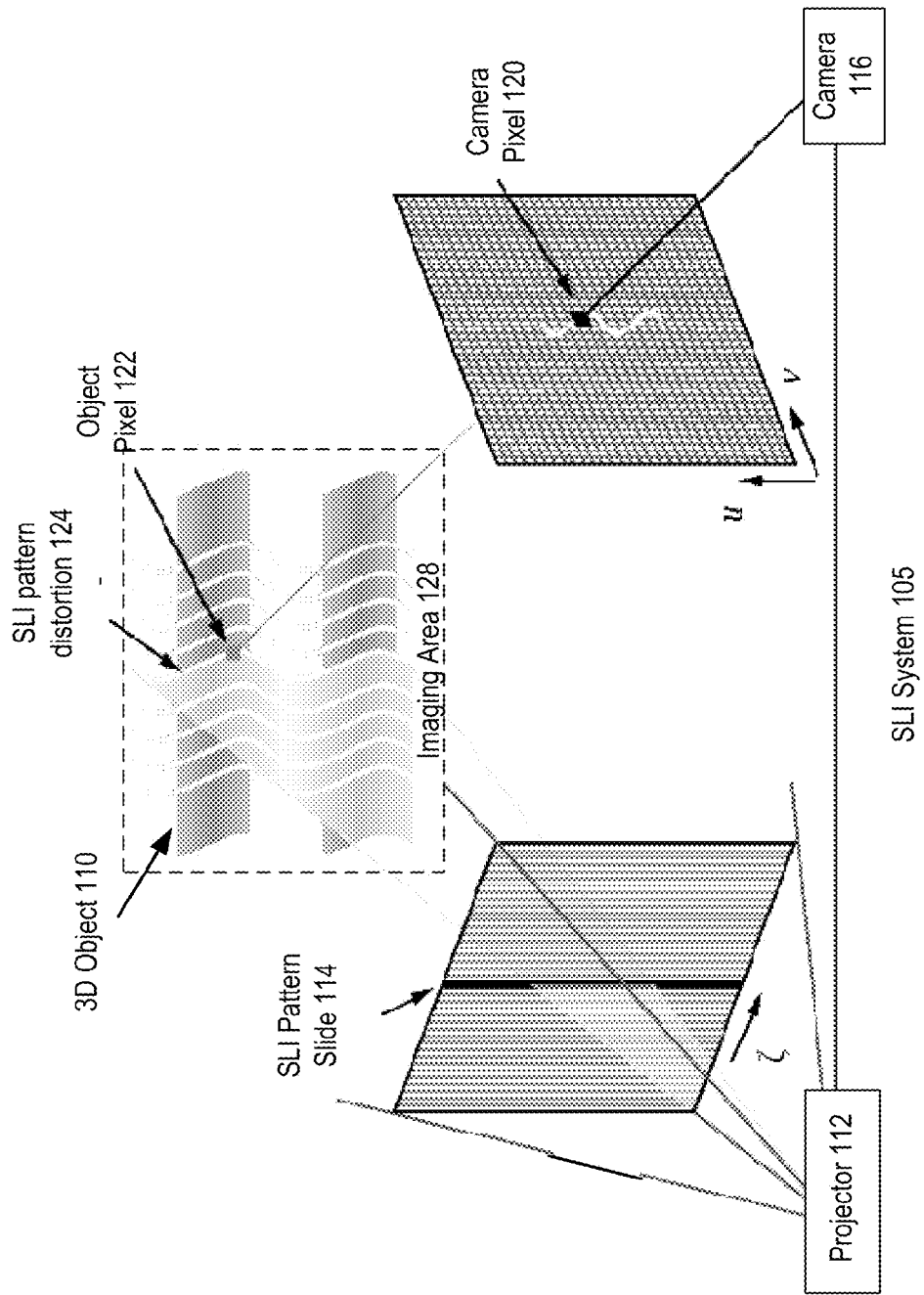
FIG. 2 illustrates a schematic block diagram of an embodiment of an SLI system.

An example of a 3D biometric image sensor 102 and processing module 104 is described in PCT Application No. WO/2007/050776, entitled System and Method for 3D Imaging using Structured Light Illumination, which is incorporated by reference herein. FIG. 2 illustrates a schematic block diagram of an embodiment of a Structured Light Illumination (SLI) system 105 that may be implemented in the 3D biometric image sensor 102. The SLI system 105 includes an SLI pattern projector 112 and camera 116. The SLI pattern projector includes a DLP projector, LCD projector, LEDs, or other type of projector. The camera 116 includes one or more digital cameras or image sensors operable to capture digital images.

In operation, the SLI pattern projector 112 projects focused light through an SLI pattern slide 114 onto 3D object 110 in imaging area 128. The SLI pattern is distorted by the surface variations of 3D object 110 as seen with SLI pattern distortion 124. While the SLI pattern is projected onto 3D object 110, a camera 116 captures an image of the 3D object with the SLI pattern distortion 124. The camera 116 generates a frame composed of a matrix of camera pixels 120 wherein each camera pixel 120 captures image data for a corresponding object point 122 on the 3D object 110. The camera 116 captures one or more images of the 3D object 110 with the distortions in the structured light pattern. Additional SLI slide patterns may be projected onto the 3D object 110 while additional images are captured. The one or more 3D biometric images are then stored in a biometric image data file for processing.

Referring again to FIG. 1, the 3D image processing module 104 processes the 3D biometric image data. The distortions in the structured light pattern are analyzed and calculations performed to determine a spatial measurement of various object points 122 on the 3D object surface. This processing of the images uses well-known techniques in the industry, such as standard range-finding or triangulation methods. The triangulation angle between the camera and projected pattern causes a distortion directly related to the depth of the surface. Once these range finding techniques are used to determine the position of a plurality of points on the 3D object surface, then a 3D data representation of the 3D object can be created. An example of such calculations is described in U.S. patent application Ser. No. 10/444,033, entitled, "System and Technique for Retrieving Depth Information about a Surface by Projecting a Composite Image of Modulated Light Patterns," by Laurence G. Hassebrook, Daniel L. Lau, and Chun Guan filed on May 21, 2003, which is incorporated by reference here. The 3D coordinates for a plurality of object points is determined. Collectively, the plurality of points result in a 3D surface map. Each point in the 3D surface map is represented by 3D coordinates, such as Cartesian (x, y, z) coordinates, spherical (r, θ, ϕ) coordinates or cylindrical (y, r, θ) coordinates. In addition, each point includes texture data. Texture data includes color values, such as Red, Green and Blue values. Texture data also includes grey values or brightness values as well. The 3D image processing module thus creates a 3D surface map of the 3D object based on the 3D biometric image data. Though an SLI technique is described herein, other techniques for generating 3D surface maps can be implemented in the system as well. For example, another 3D scanner is a time of flight 3D laser scanner that computes the relative coordinates of a 3D surface map from the round trip time of a pulse of laser light. A conoscopic holography scanner analyzes a diffraction pattern to determine a 3D surface map. And a modulated light scanner detects a reflected light pattern to generate a 3D surface map. Other techniques include a stereovision based system, shape from shading techniques and shape from silhouettes techniques.

Once the 3D surface map is generated, it is further processed by ignoring certain points while connecting other points to reduce the 3D surface map data. In an embodiment, 3D image processing module 104 includes a segmentation module to segment the 3D surface map to eliminate unwanted points or data. The segmentation technique includes background-foreground modeling to eliminate background image data from a region of interest. The background-foreground modeling is performed as part of a training stage by collecting a number of background images and computing the average background model image. The foreground image information is extracted by labeling any image pixel that does not lie within a specified tolerance of the average background model image. The segmented 3D shape is the 3D information for the segmented foreground image. For example, the 3D points on a surface map for a finger are extracted from background points or separated from the 3D points of other fingers.

In known systems, once a 3D surface map is created of a fingerprint, a 2D rolled equivalent print is generated from the 3D surface map. This conversion allows the known systems to capture and store data in 3D while at the same time remaining backward compatible with existing databases of fingerprints that meet NIST/FBI standards, such as ANSI/NIST ITL 1-2000. Feature recognition and matching of features is then performed using the 2D rolled equivalent print or a converted 2D binary image. The feature data generated from the 2D binary image includes coordinates only in two dimensions, such as x, y coordinates.

The conversion of the 3D surface map to 2D rolled equivalent print or 2D binary image results in a loss of data. The use of 3D biometric data from the 3D surface map can improve detection and recognition of the biometric data.

Figure 3:
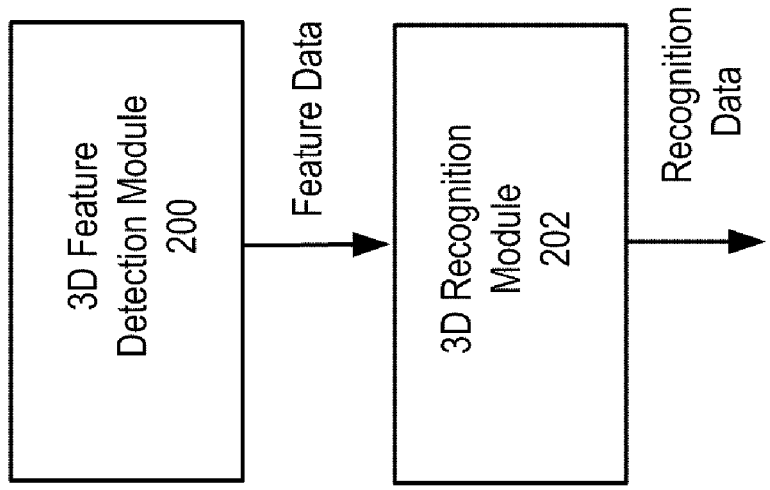
FIG. 3 illustrates a schematic block diagram of an embodiment of a system for 3D biometric data feature detection and recognition.
Figure 4:
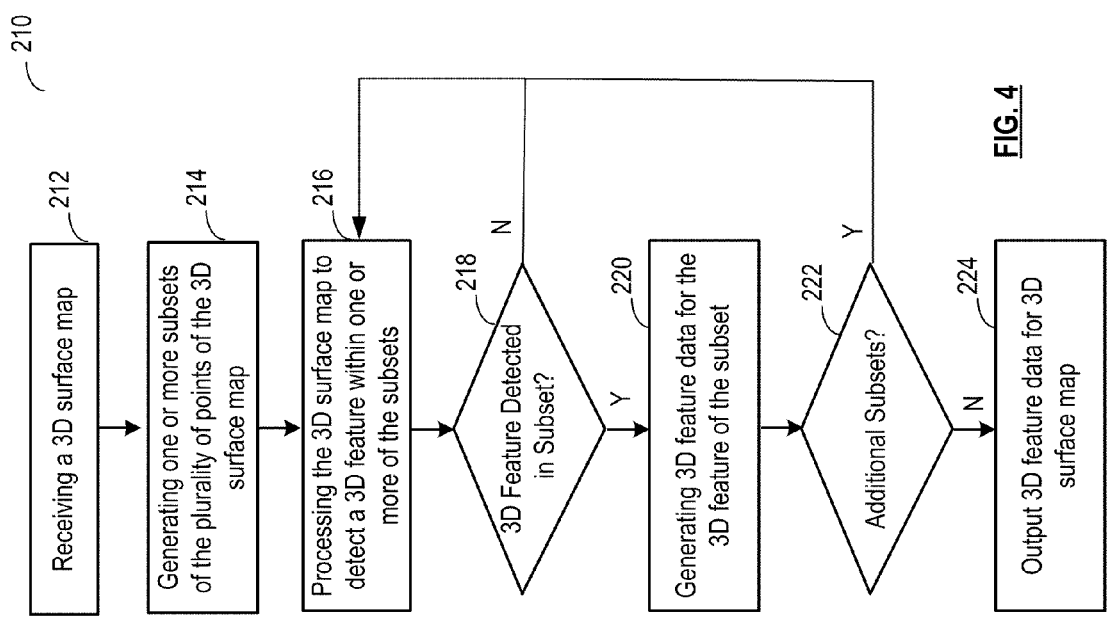
FIG. 4 illustrates a logic flow diagram of an embodiment of the operation of 3D feature detection module.

FIG. 3 illustrates a schematic block diagram of an embodiment of a system 204 for 3D biometric data feature detection and recognition. The system 204 includes a 3D feature detection module 200 and 3D recognition module 202. FIG. 4 illustrates an embodiment of the operation of 3D feature detection module 200 shown in FIG. 3. The 3D feature detection module 200 receives the 3D surface map from the 3D image processing module 104 in step 212. The 3D surface map includes a plurality of points having 3D coordinates. The points may also include texture data. In an embodiment, the 3D surface map is of a fingerprint or palm print though other biometric objects can be utilized in the system and method described herein.

The 3D feature detection module 200 logically divides the 3D surface map into one or more subsets of points for processing in step 214. For each subset, the 3D feature detection module 200 determines whether a 3D feature is present in step

216. When it is determined that a subset includes a 3D feature in step 218, the 3D feature detection module 200 generates 3D feature data for the detected feature in step 220. The 3D feature data includes 3D location data and feature type. The 3D feature detection module 200 then determines in step 222 if additional subsets of points need to be processed. If so, the process continues to determine 3D features for the additional subsets. If not, the 3D feature detection module 200 outputs the feature data of the detected features for the 3D surface map.

Figure 5:
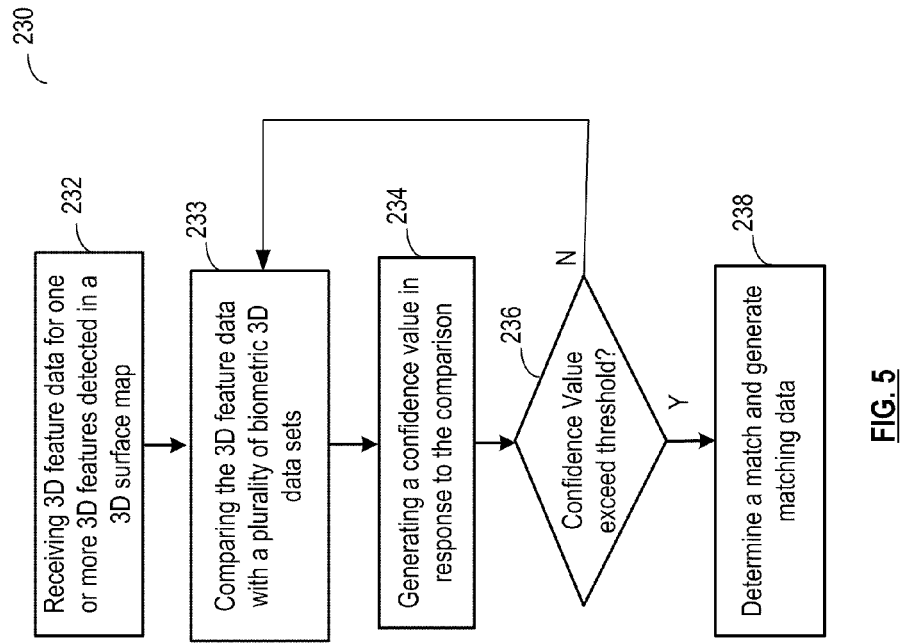
FIG. 5 illustrates a logic flow diagram of an embodiment of the operation of 3D recognition module.

FIG. 5 illustrates an embodiment of the operation of the 3D recognition module 202. The 3D recognition module 202 receives the 3D feature data for the detected 3D features in step 232 and compares the 3D feature data with a plurality of biometric data sets in step 233. The biometric data sets include feature data for identified persons. The 3D recognition module 202 generates a confidence value in response to each comparison between the 3D feature data and the biometric 3D data sets in step 234. When the confidence value exceeds a threshold in step 236, the 3D recognition module 202 determines a match between the 3D feature data and one of the plurality of 3D biometric data sets in step 238.

In another embodiment, the 3D surface map is also processed to detect one or more 2D features and generate 2D feature data. The 2D feature data is then compared with biometric data sets that include 2D feature data. By comparing both 3D feature data and 2D feature data with the known biometric data sets, recognition is further improved.

Figure 6:
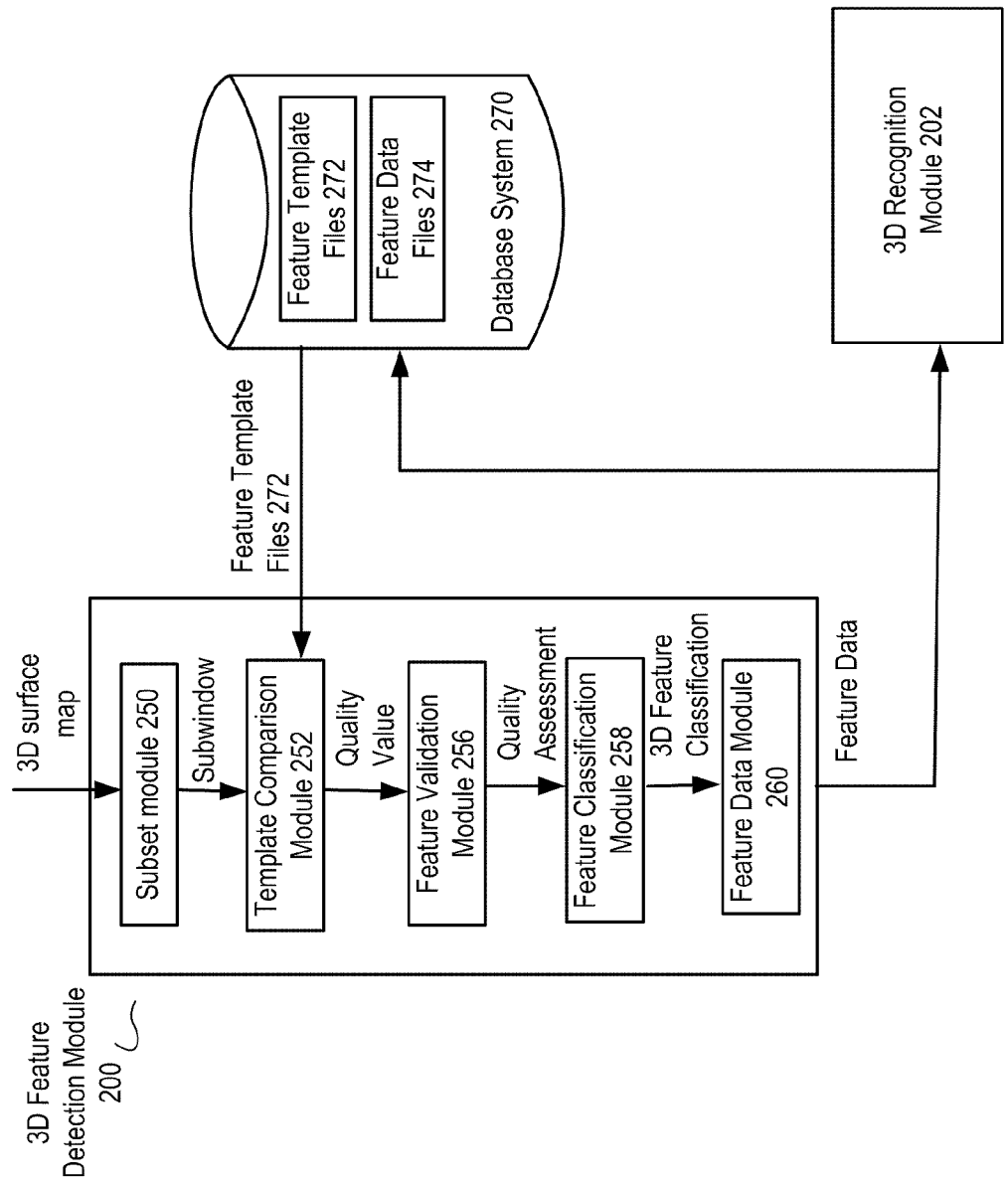
FIG. 6 illustrates an embodiment of a 3D feature detection module.

FIG. 6 illustrates an embodiment of the 3D feature detection module 200 in more detail. In general, the 3D detection module 200 includes one or more processing devices, such as a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The 3D detection module 200 includes a memory that is an internal memory or an external memory. The memory of the 3D detection module 200 may each be a single memory device or a plurality of memory devices. Such a memory device may be a read-only memory, random access memory, volatile memory, non-volatile memory, static memory, dynamic memory, flash memory, cache memory, and/or any device that stores digital information. The 3D detection module 200 may implement one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry. 3D detection module 200 may execute hard coded and/or software and/or operational instructions stored by the internal memory and/or external memory to perform the steps and/or functions illustrated in FIGS. 2 through 15 described herein.

The 3D detection module 200 includes Subset Module 250, Template Comparison Module 252, Feature Validation Module 256, Feature Classifier Module 258, and Feature Data Module 260. Though the modules are shown as separate modules, one or more of the functions of the modules may be combined into another module or functions further segmented into additional modules. The 3D detection module 200 and the Subset module 250, Template Comparison module 252, Feature Validation Module 256, Feature Classifier Module 258, and Feature data module 260 may be integrated into one or more devices or may be separate devices. The 3D Feature Detection Module 200 is coupled to a database system 270. The database system 270 stores 3D feature template files 272 and feature data files 274.

The subset module 250 receives the 3D surface map of the biometric object, e.g. fingerprint or palm print. The 3D surface map includes a plurality of points each having 3D coordinates. The 3D coordinates include for example Cartesian (x, y, z) coordinates, spherical (r, θ, φ) coordinates or cylindrical (y, r, θ) coordinates. The 3D coordinates are in reference to an axis point defined in the surface map or other defined reference plane. Each of the points in the surface map can also include texture data. For example, texture data includes color information such as RGB values or a brightness value or a grey level. The subset module divides the 3D surface map into subwindows or subsets of the plurality of points. The subsets of points may be exclusive or overlapping. This step is performed to ease processing of feature detection and may be eliminated depending on the application.

The template comparison module 252 processes the subsets of points to detect one or more predetermined types of features. For example, in the case of fingerprints and palm-prints, types of features include various patterns of ridges and furrows as well as minutiae points. Minutiae points are local ridge characteristics that occur at a ridge bifurcation, a ridge termination, ridge lake, independent ridge, point of island, spur or crossover ridge. Basic patterns of ridges and furrows include a whorl, arch and loop. These patterns may be further classified into plain arches or tented arches. Loops may be radial or ulnar depending on the side of the hand the tail points towards. Whorls also have sub-group classifications including plain whorls, accidental whorls, double loop whorls, peacock's eye, composite, and central pocket loop whorls. Cores and deltas and scars on the fingerprint are further types of features. Further features may be defined in other classification systems having different defined patterns and minutiae points than those described herein.

Since the 3D coordinates are available from the 3D surface map, additional types of 3D features can be detected. For example, ridge height, ridge shape, ridge angle and furrow depth can be determined. In addition, gradients of ridge height or furrow depth can be measured to produce a gradient vector field. Finger curvature, finger shape and finger size can also be determined from the 3D surface map.

Figure 7A:
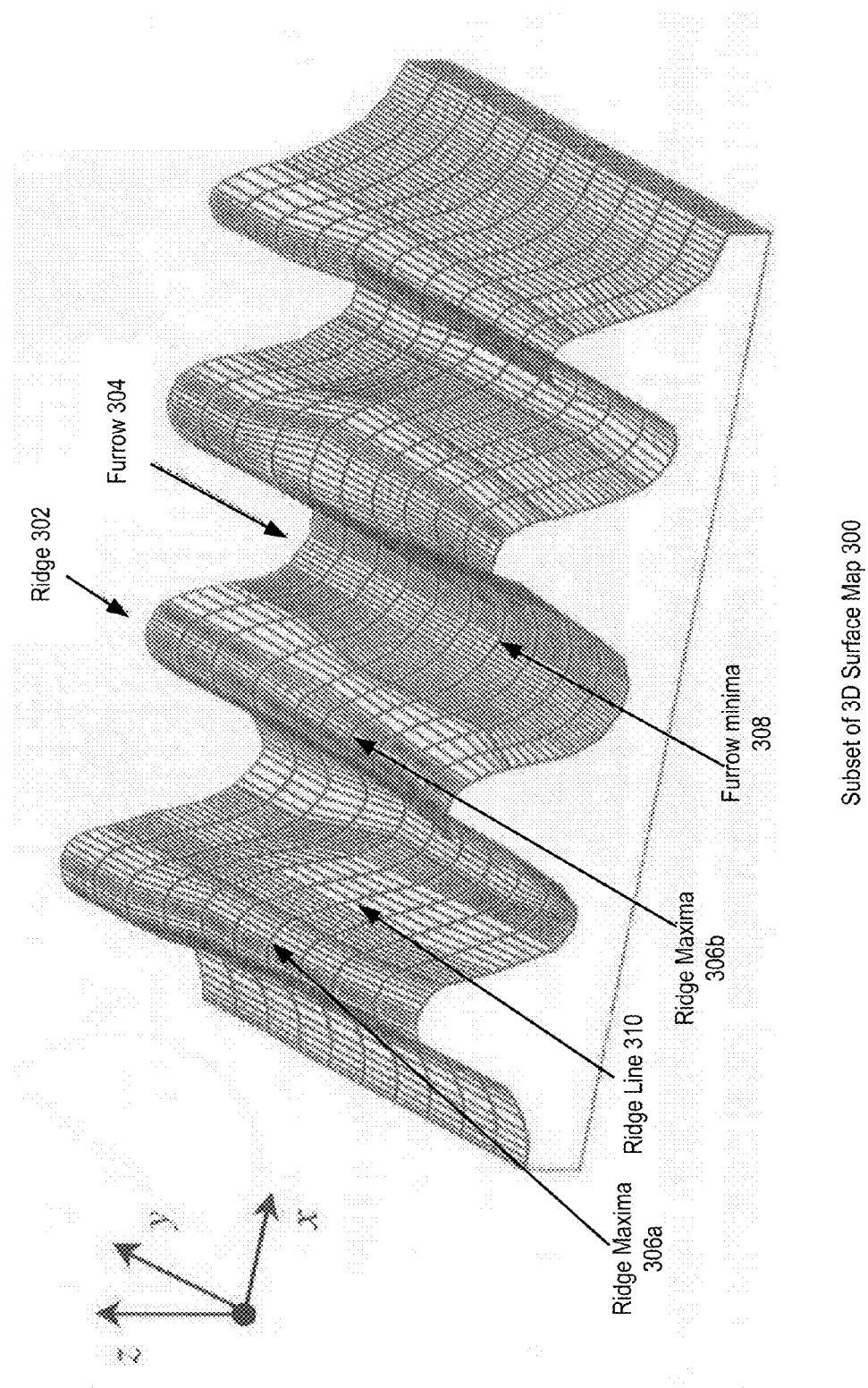
FIGS. 7a and 7b illustrate an example of a subset of a 3D surface map.

FIG. 7a illustrates an exemplary subset of a 3D surface map 300. In the example embodiment in FIG. 7a, points of the subset are interconnected by lines to create a mesh for the illustration. A ridge 302 and furrow 304 are shown. By processing the 3D coordinates of the plurality of points, the 3D features types are detected in the 3D surface map. For example, ridge maxima 306a and 306b and furrow minima 308 are shown along a ridge line 310. In another example, a vector field of ridge heights is constructed with each vector including 3D coordinates and a vector angle corresponding to a direction of the ridge at that coordinate. The vector length is then proportional to a ridge height. In another example, as seen in FIG. 7a, the ridge width differs along a length of a ridge. To determine a ridge width, the difference between ridge maxima 306a and ridge maxima 306b is calculated. The ridge width can also be defined as the difference between a mean or average height of slopes of a ridge. The change in ridge widths can be determined to produce a gradient vector field. In another embodiment, a gradient field is calculated that shows changes in ridge height or furrow minima. The shape of a ridge or slopes of a ridge or furrow can also be determined as a type of 3D feature. In another embodiment, the 3D features include a distribution of furrow minima or ridge maxima. 3D features can further include defined features along a ridge edge such as alignment and shape of an individual ridge.

Figure 7B:
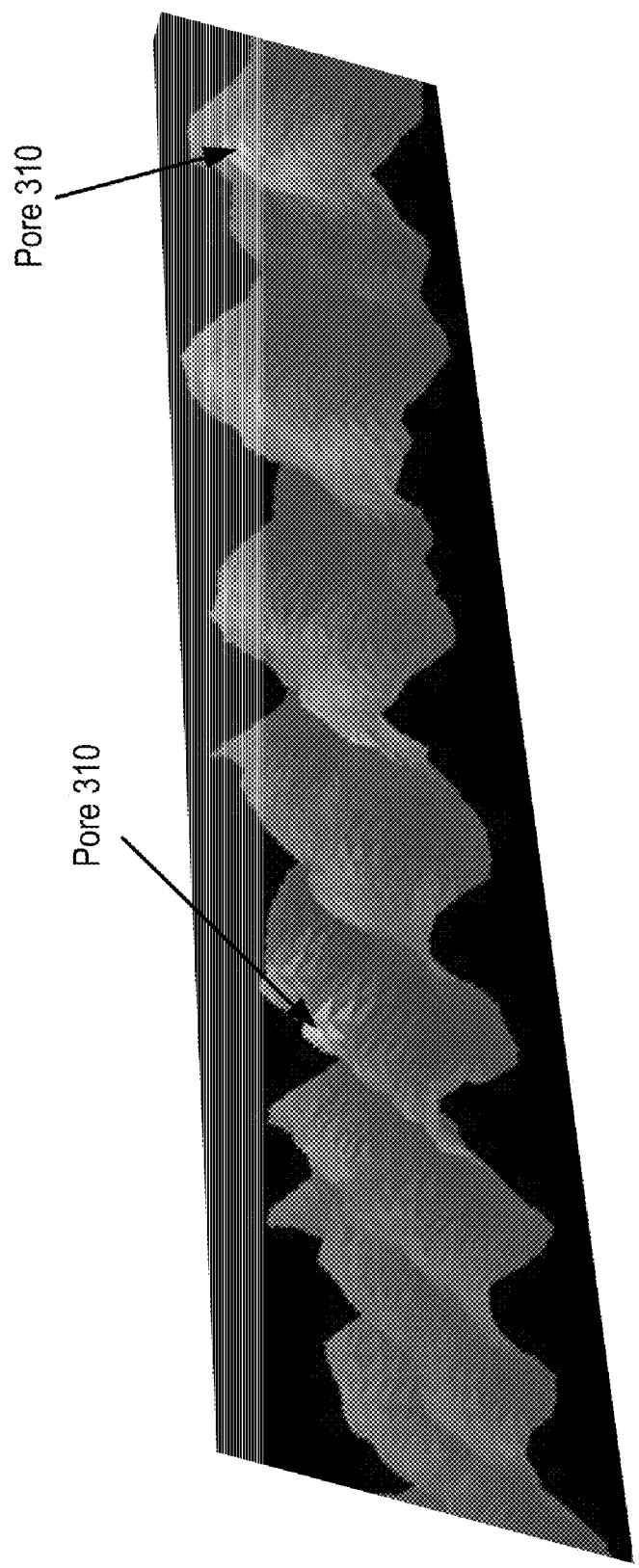

In another embodiment, features relating to pores are extracted from the 3D surface map. FIG. 7b illustrates a perspective view of an exemplary subset of a 3D surface map 300 illustrating various pore features. Various pore features include number of pores, distance between pores, size of a pore, shape of a pore and position of a pore on a ridge or furrow. Further pore features include the position of a pore on a ridge or edge of ridge. FIG. 7b illustrates a portion of a 3D surface map 300. Various pores 310 are illustrated on the 3D surface map.

Referring back to FIG. 6, the template comparison module 252 compares the subsets of points to one or more 3D feature templates 272. In an embodiment, each one of the 3D feature templates corresponds to a type of feature. To generate a 3D feature template, a training dataset for a feature is analyzed with a training algorithm to generate a feature vector or unique identifier for the feature. The feature vector, such as an M×N vector, includes 3D coordinates and texture information. The training dataset includes a plurality of sets of 3D point clouds with texture data corresponding to the feature. The training algorithm filters the dataset and creates a feature vector by reducing redundant information or removing extreme values. A training algorithm includes one or more of matched filters, correlation filters, Gabor filters (Gabor wavelets, log-Gabor wavelets) and Fourier transforms. A 3D feature template includes the feature vector with 3D coordinates for a feature orientation, shape and scale. In addition, for each feature, templates can be generated to further define sub-features.

In an embodiment, the 3D feature templates for fingerprints include templates for the following types of features: a ridge shape, a ridge height, a furrow depth, a furrow shape, ridge maxima distribution, furrow minima distribution, a ridge height or furrow depth vector field, ridge height or furrow depth gradient field, finger curvature, finger shape and finger size. In addition, 3D feature templates include at least of the following predetermined classifications: a whorl, an arc, a loop, a delta, a core, a ridge ending, ridge orientation and a type of minutia point. In another embodiment, features related to pores such as number of pores, distance between pores, size of pores, shape of pores and position of the pores on a ridge or furrow are included as 3D feature templates.

The template comparison module 252 compares a subset of the 3D surface map with a feature vector. Again, matched filters, correlation filters, Gabor filters (with Gabor wavelets, log-Gabor wavelets) and Fourier transforms can be used to perform the comparison between the feature vector and subset. Based on the comparison, the template comparison module 252 generates a quality assessment value. In another embodiment, a multi-layered neural network can be implemented to process the subset and determine a type of feature in the data.

The template comparison module 252 performs a subset by subset analysis for feature recognition. In another embodiment, subsets are selected for feature recognition based on a flow direction of a ridge or valley. Ridge or valley flow direction measured with vectors fields are used to select the subsets for feature recognition. The template comparison module 252 compares a subset to one or more 3D feature templates. After a comparison with a feature template, a quality assessment value is assigned based on a probability or correlation that a feature is present in the subset.

The feature validation module 256 analyzes the quality assessment values assigned to subsets and determines a quality assessment. Not all the features detected by the template comparison module 252 are valid. The feature validation module 256 adds another level of robustness to the overall system. The feature validation module 256 detects distinctions between valid and invalid features in the 3D surface map. For example, when a quality assessment value falls below a threshold, the feature validation module 256 employs additional processing to determine whether a valid feature is present in the location. In another embodiment, the feature validation module further defines a type of feature detected by the template comparison module 252. The feature validation module 256 employs larger M×N feature vectors with additional information for a type of feature and additional training vectors to further define a type of feature. The feature validation module 256 processes the subsets using one or more of the following methods: Principal Component Analysis (PCA), Independent component analysis (ICA), Linear discriminant analysis (LDA), Kernel-PCA, Support Vector Machine (SVM) or a Neural Network. For example, the feature validation module 256 processes a feature detected by the template comparison module 252 and generates a PCA vector. The generated PCA vector is then compared with one or more feature vectors. A quality assessment is generated based on the comparison.

The feature classification module 258 receives a quality assessment from the feature validation module 256. The feature classification module 258 is a feature labeling stage. In an embodiment, each valid feature is labeled accordingly as a type of feature, such as minutiae, whorl, delta, ridge ending, bifurcation, etc. One or more of the classified features with high quality assessments are labeled as dominant features. Clusters of features are also identified. In a minutiae-based techniques, minutiae points are classified as a ridge bifurcation, a ridge termination, ridge lake, independent ridge, point of island, spur or crossover ridge. In an embodiment, the relative placement of classified minutiae points are then determined on the 3D surface map. In a correlation-based embodiment, a global pattern of ridges and furrows is classified into a category such as arch, loop, scar, or whorl.

The feature classification module 258 outputs the feature data for the 3D surface map. The feature data includes a list of features with 3D coordinates and type of feature. In an embodiment, the feature data further includes relative placement of the features with respect to other features. For example, it may include a distance or number of ridgelines between features. The feature data may further include an orientation angle of a feature. When a feature includes a vector or gradient vector, the feature data includes 3D coordinates, orientation angle of the vector and value for the vector. The feature data further includes the quality assessment value of the feature. The feature data for a 3D surface map is stored in a feature data file 274 in database system 270.

Figure 8:
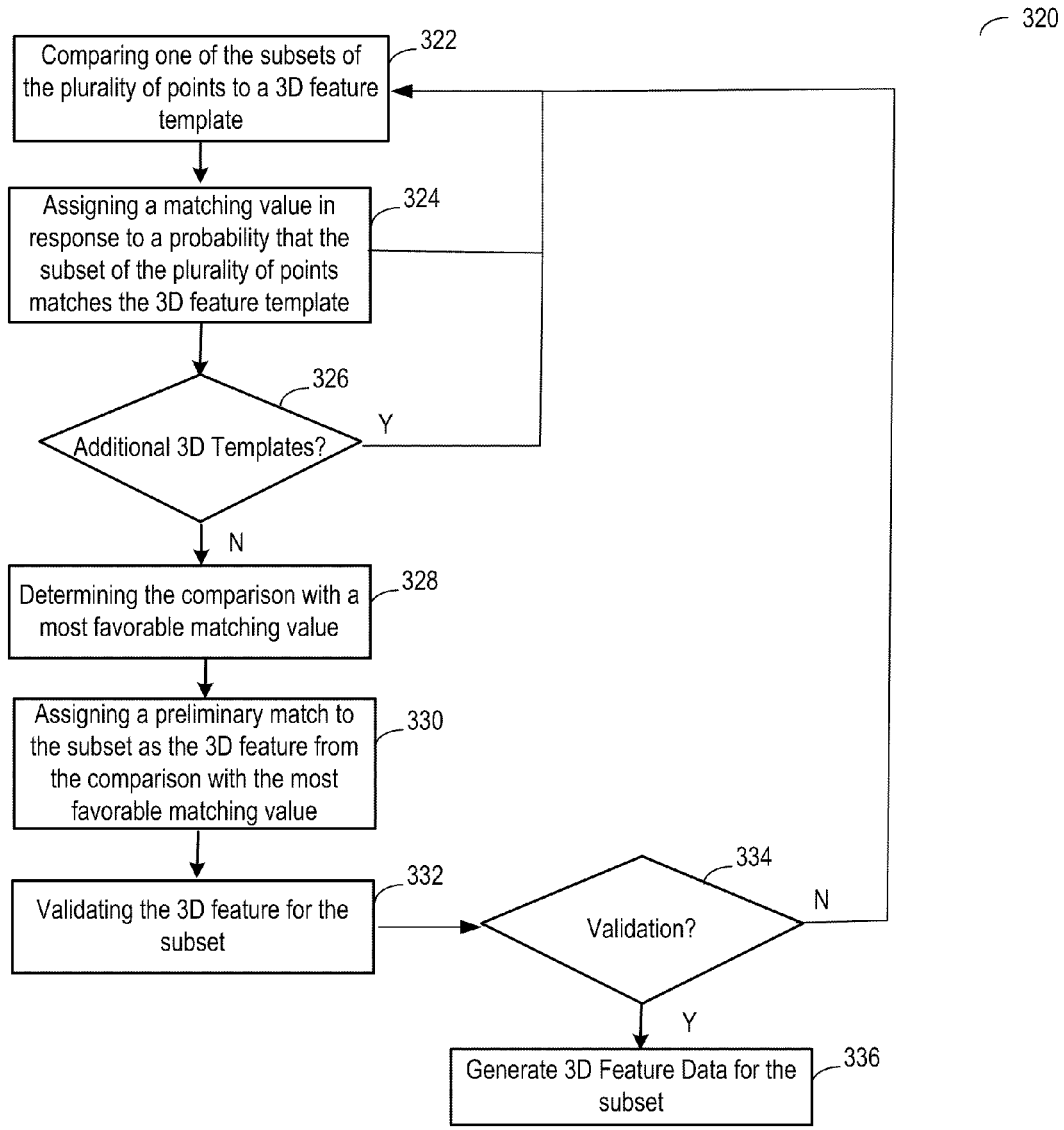
FIG. 8 illustrates an embodiment of a method of operation of a 3D feature detection module.

FIG. 8 illustrates an embodiment of a method of operation 320 of the 3D feature detection module 200. In step 322, a subset of a 3D surface map is compared with a first one of a plurality of 3D feature templates, wherein each of the 3D feature templates is associated with a different 3D feature. A matching value is assigned to each comparison of the plurality of 3D feature templates with the subset in step 324. In step 326, it is determined if another 3D template needs to be processed. If not, the comparison with a most favorable matching value is determined in step 328. A preliminary assignment is made that the 3D feature with the most favorable matching value is included within the subset. In step 332, a validation process further analyzes the subset to determine whether the 3D feature is present. If validated, feature data for the 3D feature is generated in step 336.

FIG. 9a illustrates another embodiment of a method of operation 350 of the 3D feature detection module 200. In step 352, a 3D surface map is processed as described herein to identify 3D features. 3D feature data for the identified features is generated. In step 354, the 3D surface map is converted into 2D image data. The conversion is performed using one or more known processes, e.g. as described in PCT Application No. WO2007/050776, entitled System and Method for 3D Imaging using Structured Light Illumination, which is incorporated by reference herein. The 2D image data is then processed to identify features and generate 2D feature data. The 2D feature data includes 2D coordinates, such as x,y coordinates and an angle of orientation within the x, y plane of a feature and type of feature information. Feature data for the fingerprint thus includes 2D feature data and 3D feature data. In an embodiment, the feature data includes relative location between 2D features and 3D features. For example, a core of a fingerprint occurs at a point of maximum ridge line curvature. Information on relative position of a ridge maxima to the core of a loop of a fingerprint image includes 3D coordinate information for the ridge maxima and 2D coordinate information for a location of the core.

FIG. 9b illustrates another embodiment of a method of operation 360 of the 3D feature detection module 200. In step 362, a 3D surface map is processed as described herein to identify 3D features and generate 3D feature data. In step 354, the 3D surface map is processed to generate 2D feature data without flattening or converting the 3D surface map into a 2D binary image. Instead, 2D feature data is mapped directly from the 3D coordinates and angles. In a 3D surface map, the measurement differences between minutia points at a local distance are minimal between a 3D surface map and 2D binary image. The distance and angle measurements of features in the 3D surface map can be directly compared to 2D coordinates. When mapping 3D feature data to 2D feature data, e.g. for compatibility with current ANSI/NIST standardized files, the x, y coordinates are determined from the 3D surface map and mapped to x, y coordinates in the 2D feature data. The distances between features and orientation angle are mapped directly during matching. This method avoids locally concentrated distortions that can occur with flattening methods. In an embodiment, since the errors increase with distance between features, the 3D surface map can be converted into 2D binary image to generate 2D feature data for relatively larger fingerprint patterns, such as whorls, loops and arches while the 3D feature data is mapped directly to generate 2D feature data for clusters of minutia points in relatively close proximity. The feature data for the fingerprint including 2D feature data and 3D feature data is generated in step 364.

Figure 10:
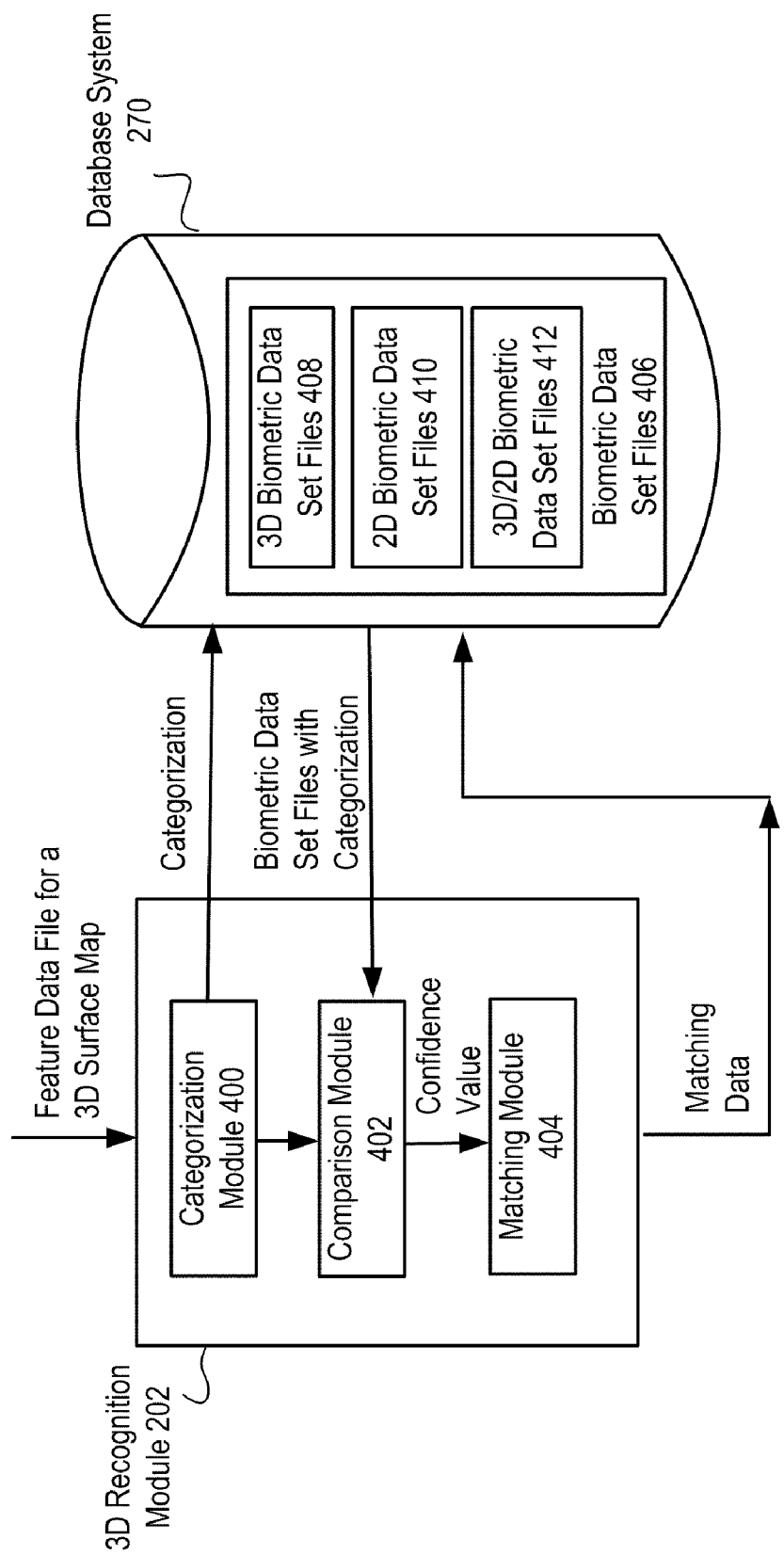
FIG. 10 illustrates a schematic block diagram of an embodiment of the 3D recognition module.

FIG. 10 illustrates a schematic block diagram of an embodiment of the 3D recognition module 202. In general, the 3D recognition module 202 includes one or more processing devices, such as a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The recognition module 202 includes a memory that is an internal memory or an external memory. The memory of the recognition module 202 may each be a single memory device or a plurality of memory devices. Such a memory device may be a read-only memory, random access memory, volatile memory, non-volatile memory, static memory, dynamic memory, flash memory, cache memory, and/or any device that stores digital information. The recognition module 202 may implement one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry. The 3D recognition module 202 may execute hard coded and/or software and/or operational instructions stored by the internal memory and/or external memory to perform the steps and/or functions illustrated in FIGS. 2 through 15 described herein.

The 3D recognition module 202 includes a categorization module 400, a comparison module 402 and matching module 404. Though the modules are shown as separate modules, one or more of the functions of the modules may be combined into a module or functions further segmented into additional modules. The 3D recognition module 202, categorization module 400, comparison module 402 and matching module 404 may be integrated into one or more devices or may be separate devices.

The 3D recognition module 402 interfaces with database system 270. The database system 270 stores a set of files with biometric data 406. The Data Set Files 406 includes feature data for known fingerprints, palm prints or other biometric data to be matched. The data set files 406 include data files with 3D biometric data 408 and data files with 2D biometric data. 3D biometric data set files 408 include 3D feature data with location of features types in 3D coordinates. The 2D biometric data set files 410 include 2D feature data with location of features types in 2D coordinates. In addition, the 3D/2D biometric data set files 412 include both 3D feature data and 2D feature data. In operation, the 3D recognition module 202 receives the feature data for a 3D surface map and matches the feature data with one of the known data set files 406. The feature data can include 3D feature data and 2D feature data generated from the 3D surface map.

Figure 11:
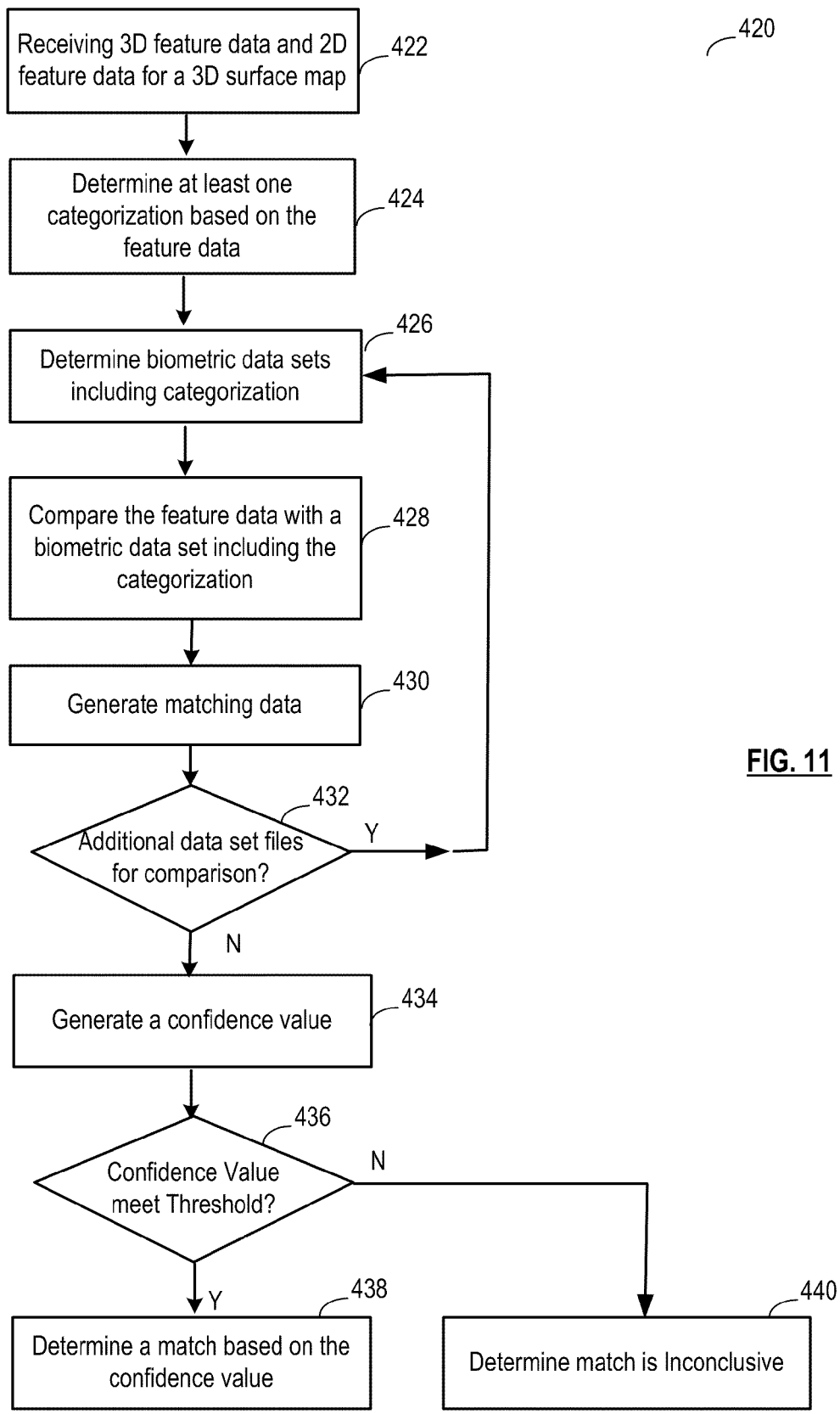
FIG. 11 illustrates a logic flow diagram of an embodiment of a method of operation of the 3D recognition module.

FIG. 11 illustrates a logic flow diagram of an embodiment of a method of operation 420 of the 3D recognition module 202 in more detail. In step 422, the 3D recognition module 202 receives feature data detected in a 3D surface map. In step 424, the categorization module 400 determines at least one category from the feature data. The category may be based on 2D feature data or 3D feature data. To reduce search time and computational complexity, it is desirable to categorize biometric data in an accurate and consistent manner so that the input feature data is required to be matched only with a subset of the data files 406 in the database. For example, for a fingerprint, the categorization module 400 categorizes a fingerprint image into the class of arch, left or right loop, scar, tented arch, or whorl. In another example, the categorization module 400 categorizes a fingerprint image based on finger size, curvature and shape. Other features or subcategories of features can also be used to further categorize the feature data. In step 426, the categorization module 400 determines the data set files 406 including one or more of the selected categories and retrieves the data set files 406 from the database system 270.

The comparison module 402 receives the data set files 406 and the feature data to be matched. The comparison module 402 processes the feature data and compares the feature data with the data set files 406 in step 428. Embodiments of the matching process are described in more detail with respect to FIGS. 12 through 14. The comparison module 402 generates matching data in step 430. Matching data includes a list of features detected in both the feature data and data set file and similarity measures for the features based on the comparison. In step 432, the comparison module 402 determines whether all the desired comparisons have been completed between the data set files 406 and the feature data of the surface map. When the comparisons are completed, the matching module 404 processes the matching data and generates a confidence value for one or more of the comparisons in step 434. The more favorable the confidence value, the more likely that a match exists. The matching module 404 selects a comparison with the most favorable confidence value and determines whether the confidence value exceeds a threshold in step 436. When the confidence value exceeds a threshold, then the matching module determines that a match has been made between the feature data of the surface map and one of the data set files 406 in step 438. When no confidence values exceed a threshold, then the matching module determines that a match is inconclusive in step 440.

Figure 12:
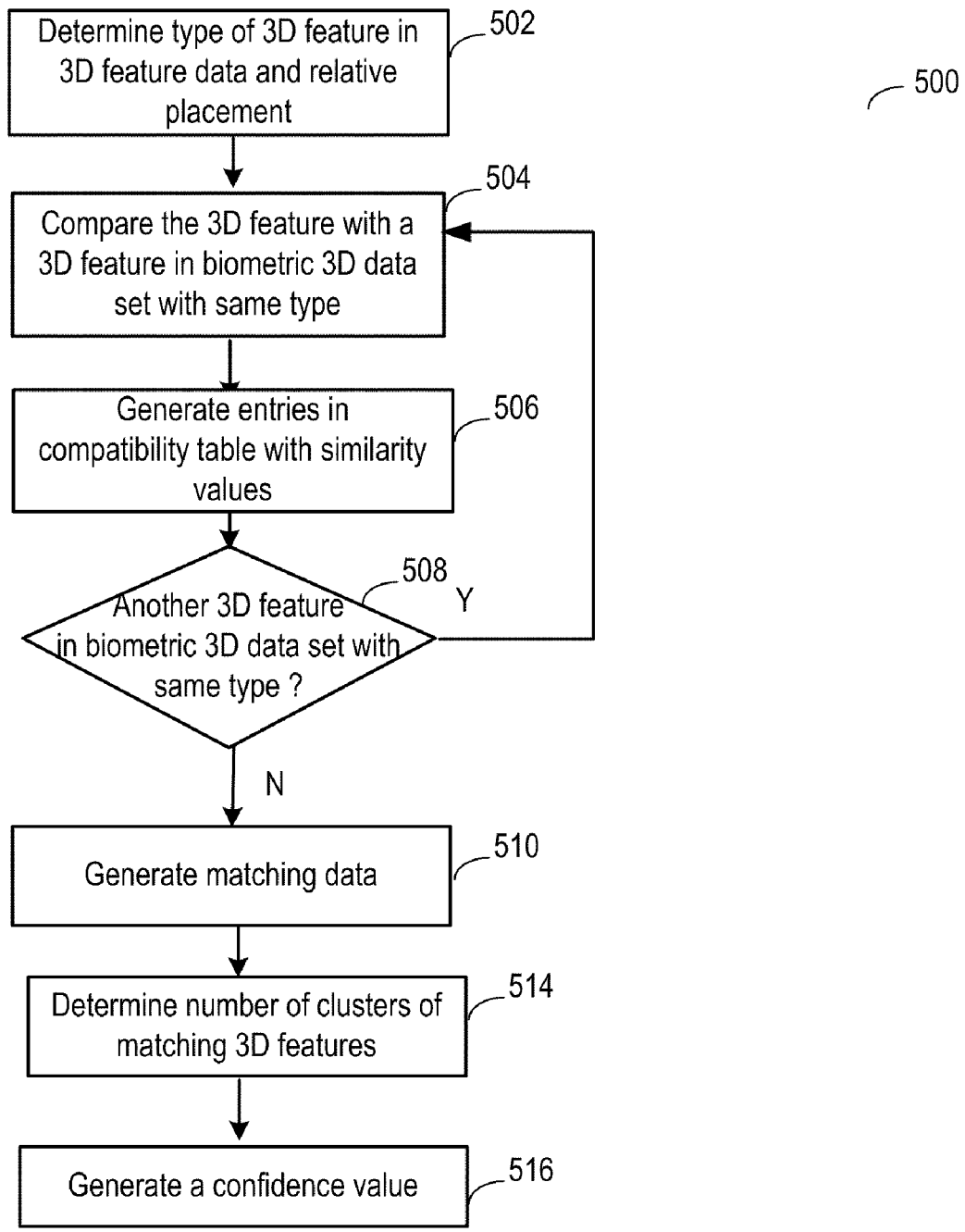
FIG. 12 illustrates a logic flow diagram of an embodiment of a method of the matching process.

FIG. 12 illustrates a logic flow diagram of an embodiment of a method 500 of the matching process for 3D feature data in more detail. In this embodiment, 3D feature data from the surface map is compared with 3D feature data from the selected data set files 406. In step 502, the comparison module 402 determines type of features in 3D feature data generated from the 3D surface map. In an embodiment, the comparison module 402 processes the 3D feature data to determine relative placement of features. For example, for biometric data such as a fingerprint or palmprint with minutiae features, the comparison module 402 determines a relative placement of the minutiae features. The relative placement between two minutiae points includes a distance between the two minutiae and angle between the minutia's orientation angle. The relative placement data is stored in a comparison table along with the minutia type. In an embodiment, only features with a quality assessment value over a threshold are included in the comparison table. One of the data set files 406 is similarly analyzed and a comparison table is generated for the selected data set file 406. The comparison module then compares entries in the two comparison tables having a same feature type in step 504 and generates a similarity value. Table entries are determined to be compatible when location data, such as 3D coordinate values, distance from another feature or relative minutiae angles, are within a specified tolerance. A compatibility table is generated including entries from the two tables that are considered compatible or matching within the specified tolerance in step 506 along with similarity values for the entries.

When comparison of the 3D features has been completed in step 508, the comparison module generates matching data in 510. The entries of the compatibility table are linked into similar clusters in step 514 and a confidence value is determined based on a number of linked entries and similarity values in step 516. In an embodiment, dominant features or features with a more favorable matching value in the 3D feature data are given greater weight, e.g. increasing the similarity value for those entries. A match between dominant features in the 3D feature data and a data set file 406 results in a higher confidence value than a match between less dominant or lower match value features. In another embodiment, only entries with a threshold similarity values are processed to determine the confidence value. This matching process is repeated for each of the selected data set files 406.

Figure 13:
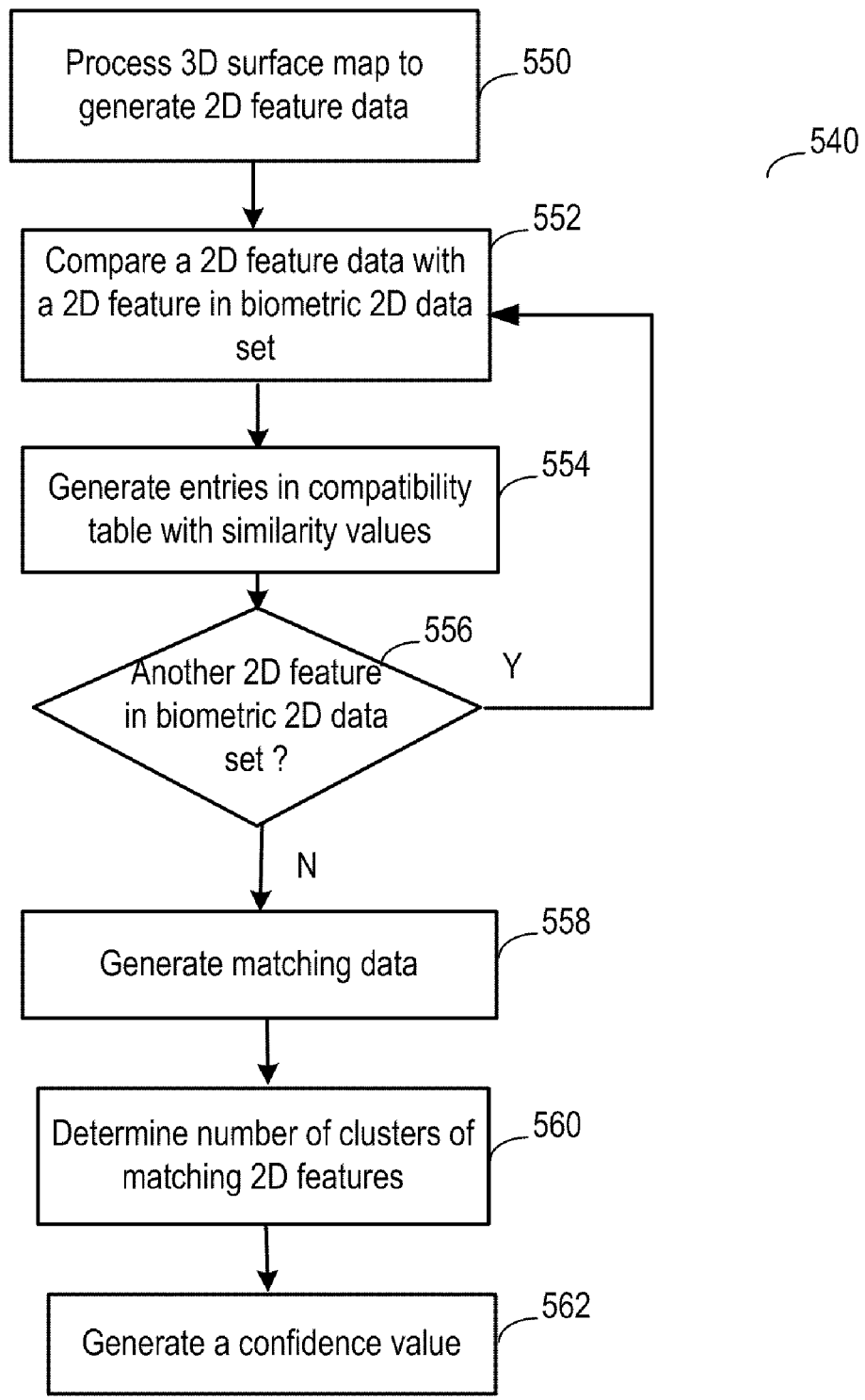
FIG. 13 illustrates a logic flow diagram of another embodiment of a method of the matching process.

FIG. 13 illustrates a logic flow diagram of another embodiment of a method 540 of the matching process. In some cases, 2D feature data is available for comparison in the biometric data set files 406. For example, in legacy NIST/ANSI standard file formats, 2D feature data is provided. In addition, an image of a latent fingerprint only provides 2D image data. The database system 270 includes 2D biometric data set files 410. The 2D biometric data set files 408 include only 2D coordinates, such as x,y coordinates. In an embodiment, an orientation angle of the feature in the x,y plane and feature type are included in the 2D feature data. Since only 2D feature data is available, certain feature types cannot be included in the 2D feature data, such as ridge height, furrow depth, etc. In such examples, it would be advantageous to compare the 2D feature data of the data set files 408 with feature data of a 3D surface map of the finger.

In another example, a latent print may be imaged on a 3D surface such as a doorknob or steering wheel. The 2D image of the latent print is distorted by the 3D surface. The 3D surface map of a suspect's finger can then distorted similarly, e.g. the 3D surface map of the finger is distorted or wrapped around dimensions of the 3D surface. The 3D surface map can then converted into a 2D binary image and features extracted. The 2D features are then able to be matched to 2D latent prints found on the 3D surface, such as of the doorknob or the steering wheel.

Referring again to FIG. 13, in step 550, the 3D surface map is processed to generate 2D feature data. The 3D surface can be converted into a 2D binary image and 2D feature data generated and/or 2D coordinates mapped directly from the 3D surface map as described with respect to FIG. 9b. The comparison module 402 processes the 2D feature data generated from the 3D surface map to determine relative placement of features. The relative placement data is stored in a comparison table along with the feature type. A comparison table is also generated for one of the 2D biometric data set files 410. A compatibility table is generated of matching features within the tolerance values, and similarity values are assigned to the entries in step 554. When comparison of similar type features is complete in step 556, matching data is generated for the comparison of the 2D feature data and the 2D biometric data set file 410 in step 558. The entries of the compatibility table are linked into similar clusters in step 560 and a confidence value is determined based on a number of linked entries and similarity values in step 562. Again, in an embodiment, dominant features or features with a more favorable matching value in the 2D feature data are given greater weight when determining the confidence value.

Figure 14:
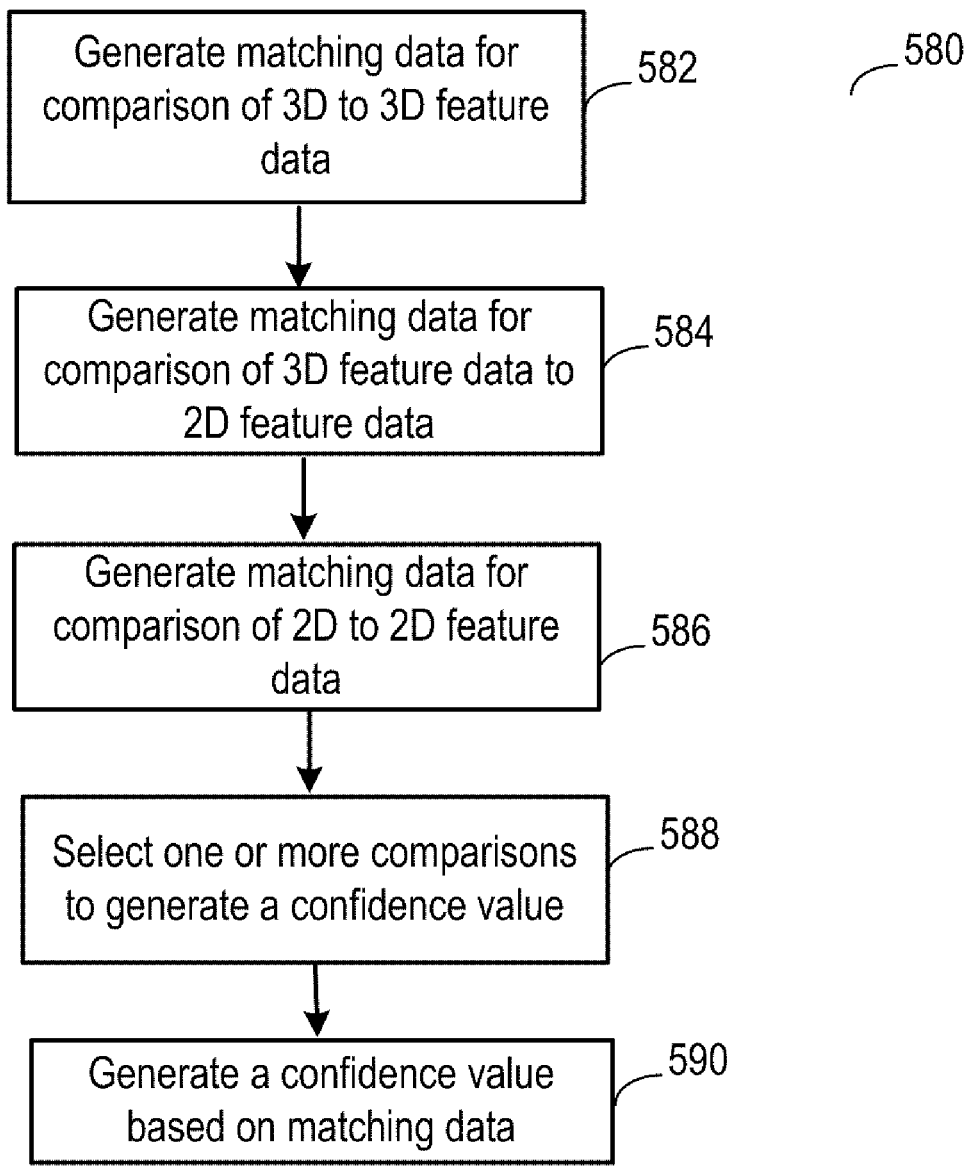
FIG. 14 illustrates a logic flow diagram of an embodiment of a method of the operation of the 3D recognition module.

FIG. 14 illustrates a logic flow diagram of another embodiment of a method of the operation of the 3D recognition module. In an embodiment, 2D feature data and 3D feature data are available in known biometric data set files 412, as shown in database system 270 in FIG. 10. Matching data, such as compatibility tables and similarity values, is generated based on comparison of 3D feature data of a 3D surface map and the 3D feature data in the 2D/3D biometric data set files 412, in step 582, as previously described herein. In step 584, The 3D feature data of a 3D surface map is compared directly with 2D feature data in the 2D/3D biometric data set files 412. As described herein, in a 3D surface map, the measurement differences between minutia points at a local distance are minimal between a 3D surface map and 2D binary image. The distance and angle measurements between features in the 3D surface map can be directly compared to measurements from a 2D binary image. In step 586, the 3D surface map is converted into 2D image data and 2D features extracted. Then the extracted 2D feature data is compared with 2D feature data in the 2D/3D biometric data set files 412. When the 2D feature data in the 2D/3D biometric data set files 412 has distortions, the 3D surface map can similarly be distorted prior to 2D conversion and feature data extracted as described herein.

A confidence value is generated in step 588 based on the matching data from the comparisons. In an embodiment, similarities in 3D feature data from the comparison step in 582 are given a greater weight when determining the confidence value. In another embodiment, matching data having greater similarity values is weighted more when determining the confidence value. Alternatively, matching data from just one of the comparisons in steps 582, 584 and 586 is used to determine the confidence value.

In an embodiment, one or more of various techniques, such as Bayesian Networks, Hidden Markov Models, Gaussian Mixture Models and/or Multi-stage filter banks, are implemented to analyze the matching data generated from one or more of the comparisons and generate the confidence value. For example, the similarity values generated in comparison of 3D features is analyzed with similarity values generated in comparison of 2D features using Baye's theorem to generate an overall confidence value.

In an embodiment, the 3D surface map is generated from one or more images captured of a 3D object as described herein. For example, in SLI techniques, an SLI pattern is projected onto a 3D object and images are captured. The distortions in the SLI pattern are analyzed with respect to reference points to determine 3D coordinates of points in the images to generate the 3D surface map. The reference points include the camera position, the projector position. These reference points are determined during calibrations of the SLI system. Because the 3D surface map includes coordinates and texture data for each point, it is a very large file to store. To save space, the captured images utilized to generate the 3D surface map and the calibrations are stored. The images can be compressed using known image compression techniques. If later calibrations of the SLI system find inaccuracies, the stored calibrations can be updated. The 3D surface map can be regenerated from the images and calibrations whenever needed. The feature data extracted from the 3D surface map can also be stored with the image files.

Figure 15:
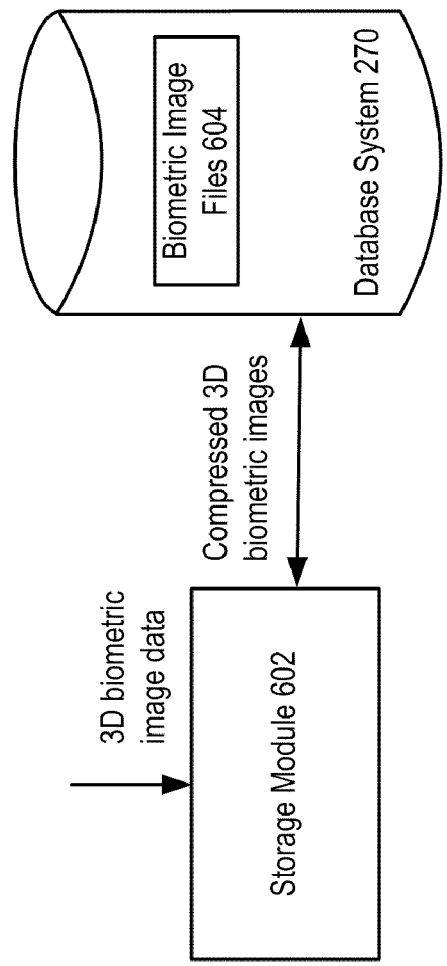
FIG. 15 illustrates a schematic block diagram of an embodiment of a storage module for storing 3D biometric image data in database system.

FIG. 15 illustrates a schematic block diagram of an embodiment of a storage module 602 for storing 3D biometric image data in database system 270. The storage module 602 may be a separate module or may be included in the 3D biometric image processing module 104 shown in FIG. 1. The storage module 602 receives the 3D biometric image data which includes images captured of a 3D object and calibrations of the SLI system. The storage module 602 compresses the images and stores the compressed files and calibrations in one or more biometric image files 604 in database system 270. Since the 3D surface map can be regenerated from the biometric image files 604, the 3D surface map does not need to be stored in the database system 270.

Figure 16:
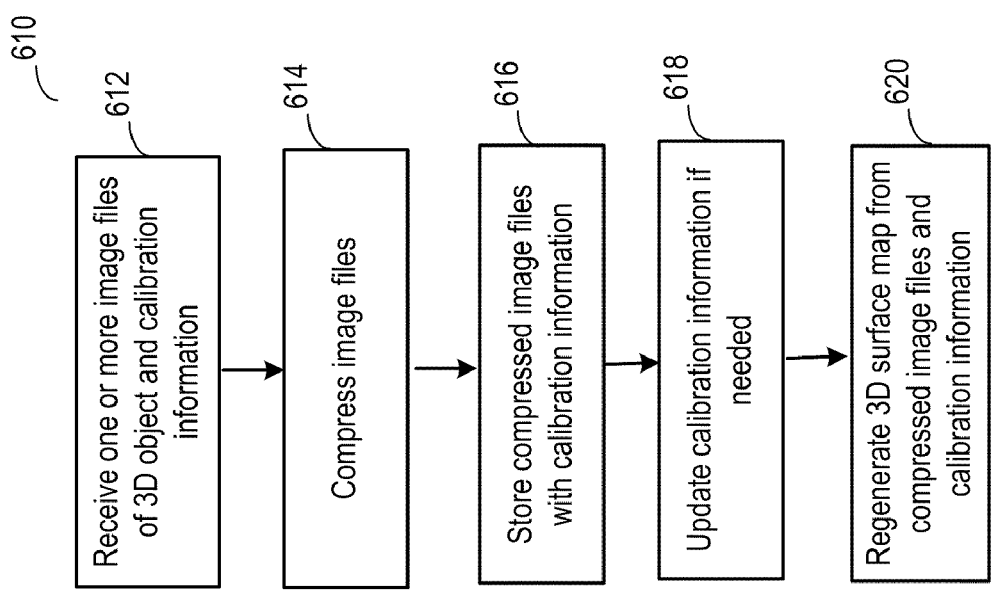
FIG. 16 illustrates a logic flow diagram of an embodiment of a method for storing 3D biometric image data in database system.

FIG. 16 illustrates a logic flow diagram of an embodiment of a method 610 for storing 3D biometric image data in database system. One or more image files of images captured of a 3D object and calibrations are received. The image files are compressed in step 614 and the compressed image files and calibration information are stored in database 270. If the calibrations of the SLI system are later updated or revised, the calibration information in the database are updated. The 3D surface map is generated from the compressed image files and calibration information in the database.

The use of 3D biometric data from the 3D surface map improves extraction of features and recognition of the biometric data. For fingerprints, additional features can be extracted from the 3D surface map, such as ridge heights, furrow depths, gradients in ridge height, etc. Additional features and feature data in 3D coordinates increases reliability of the recognition process.

As may be used herein, the term "operable to" indicates that an item includes one or more of processing modules, data, input(s), output(s), etc., to perform one or more of the described or necessary corresponding functions and may further include inferred coupling to one or more other items to perform the described or necessary corresponding functions.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by one or multiple discrete components, networks, systems, databases or processing modules executing appropriate software and the like or any combination thereof.

What is claimed is:

1. A method for three-dimensional (3D) feature detection, comprising:
   receiving a 3D surface map of a fingerprint, wherein the 3D surface map includes a plurality of points having 3D coordinates;
   generating one or more subsets of the plurality of points of the 3D surface map;
   processing the 3D surface map to detect at least one 3D feature within one or more of the subsets, wherein the 3D feature includes at least one of: a ridge shape, a ridge height, a valley depth, a valley shape, a ridge flow gradient, ridge height gradient;
   generating 3D feature data for the 3D feature detected in the 3D surface map, wherein the 3D feature data includes 3D coordinates;
   comparing the 3D feature data with a plurality of biometric 3D data sets, wherein each of the plurality of 3D biometric data sets includes 3D coordinates for at least one type of 3D feature;
   generating a confidence value in response to a comparison between the 3D feature data and one of the plurality of biometric 3D data sets; and
   determining a match between the 3D feature data and the one of the plurality of 3D biometric data sets when the confidence value exceeds a threshold, wherein one or more steps is performed using a processing module.

2. The method of claim 1, further comprising:
   determining a relative distance and orientation angle between features in the 3D surface map;
   receiving a relative distance and orientation angle between features based on a 2D binary image; and
   comparing the relative distance and orientation angle between features in the 3D surface map with the relative distance and orientation angle between features based on the 2D binary image; and
   generating a confidence value based on the comparison.

* * * * *